2,864,844

STABILIZED THIMEROSAL

Edwin O. Davisson, Greenwood, Ind., assignor to Eli Lilly and Company, Indianapolis, Ind., a corporation of Indiana No Drawing. Application February 2, 1955
Serial No. 485,798

2 Claims. (Cl. 260—433)

This invention relates to the stabilization of thimerosal.

Thimerosal, an alkyl and phenyl mercuric sulfur compound with antiseptic and bactericidal properties, is disclosed in United States Patent No. 1,672,615, granted June 5, 1928. Methods of stabilizing aqueous solutions of thimerosal have long been known and form the subject matter of United States Patents No. 1,862,896, issued August 22, 1931, and No. 2,012,820, issued August 27, 1935. Although the methods of stabilizing thimerosal solutions disclosed in these patents are effective, there are various conditions under which the degree of stabilization is insufficient and in these cases the known stabilizing procedures leave something to be desired.

I have discovered that an aqueous solution of thimerosal can be stabilized more effectively than has been possible heretofore, by incorporating in the solution a relatively small amount of ethylenediamine tetraacetic acid. A solution of thimerosal so stabilized unexpectedly shows neither a decrease in bactericidal activity, nor any oxidative or other decomposition when maintained at room temperature for prolonged periods of time, or even under accelerated aging conditions at elevated temperatures.

I have found that ethylenediamine tetraacetic acid is effective in stabilizing aqueous thimerosal solutions in a concentration as low as 0.001 percent on a weight-volume basis, or about $4.24 \times 10^{-5}$ molar. Higher concentrations of ethylenediamine tetraacetic acid, such as 0.005 percent ($2.12 \times 10^{-4}$ molar), up to 0.1 percent ($4.24 \times 10^{-3}$ molar), can also be used and are found to be equally effective. Concentrations higher than 0.1 percent of ethylenediamine tetraacetic acid, while operative, are in general not necessary under the conditions in which thimerosal is employed for antiseptic or preservative purposes. However, high concentrations could be used should some unexpectedly adverse conditions to the stability of thimerosal require their use. The amount of ethylenediamine tetraacetic acid which is effective to stabilize aqueous thimerosal solutions appears to be independent of the concentration of thimerosal therein. By aqueous is meant water-containing, and that term includes not only water itself, but also water-alcohol, water-acetone, and other water-containing mixtures. Thus the water-containing pharmaceutically useful extending media are among the aqueous solutions comprehended by the disclosure.

To prepare a stabilized aqueous solution of thimerosal in accordance with my invention, I simply add the desired amount of ethylenediamine tetraacetic acid to the solution of thimerosal to be stabilized. As is customary, the thimerosal solution is buffered to about pH 5 to 7 with a phosphate buffer, the concentration of the buffer being about 0.04 molar. However, other of the customary buffers can be employed, and the above preferred pH range is by no means critical.

Illustratively, a stabilized thimerosal solution is prepared as follows: To an aqueous solution of thimerosal in a concentration of 0.1 percent on a weight-volume basis, buffered by a neutral phosphate buffer (0.04 molar), is added sufficient ethylenediamine tetraacetic acid to furnish a concentration of about 0.1 percent on a weight-volume basis. The mixture is stirred until clear, filtered, and placed in suitable containers.

Aqueous solutions of thimerosal stabilized with ethylenediamine tetraacetic acid according to my invention are useful in the various ways in which such solutions have been employed in the past, not only for antiseptic but also for preservative purposes. These stabilized solutions are particularly useful for the protection against contamination of vaccines such as the recently developed Salk poliomyelitis vaccine. The stabilized thimerosal solutions previously known to the art do not appear to be sufficiently well stabilized to prevent at least some degree of loss of potency of the vaccine, believed to be caused by some decomposition product of thimerosal. However, a preparation of Salk poliomyelitis vaccine which contains thimerosal stabilized in accordance with my invention does not lose potency since the formation of thimerosal decomposition products is prevented. Thus Salk poliomyelitis vaccine containing thimerosal stabilized by this invention is not only protected aginst contamination, but also maintains its ability to protect vaccinated persons or animals against infection with certain strains of poliomyelitis. A preferred form of the vaccine comprises an aqueous suspension of the detoxified virus protein to which thimerosal has been added in the concentration of 0.000247 molar, and ethylenediamine tetraacetic acid in the amount of 0.00247 molar. The vaccine thus prepared can be administered to assist in producing an immunity to certain strains of poliomyelitis. Other vaccines and biological preparations can be made up employing the same or similar concentrations of thimerosal and ethylenediamine tetraacetic acid.

I claim:

1. An aqueous solution of thimerosal containing from about 0.001 to about 0.1 percent on a weight per volume basis of ethylenediamine tetraacetic acid as a stabilizing agent.

2. The process of stabilizing an aqueous thimerosal solution which comprises incorporating ethylenediamine tetraacetic acid in said solution in an amount of about 0.001 to about 0.1 percent on a weight per volume basis.

References Cited in the file of this patent

UNITED STATES PATENTS

| | | |
|---|---|---|
| 2,012,820 | Kharasch | Aug. 27, 1935 |
| 2,558,728 | Britton et al. | July 3, 1951 |

OTHER REFERENCES

Martel and Calvin: "Chemistry of the Metal Chelate Compounds," Prentice-Hall Inc., New York, N. Y. (1952).